Feb. 21, 1967  A. S. COX ET AL  3,304,894

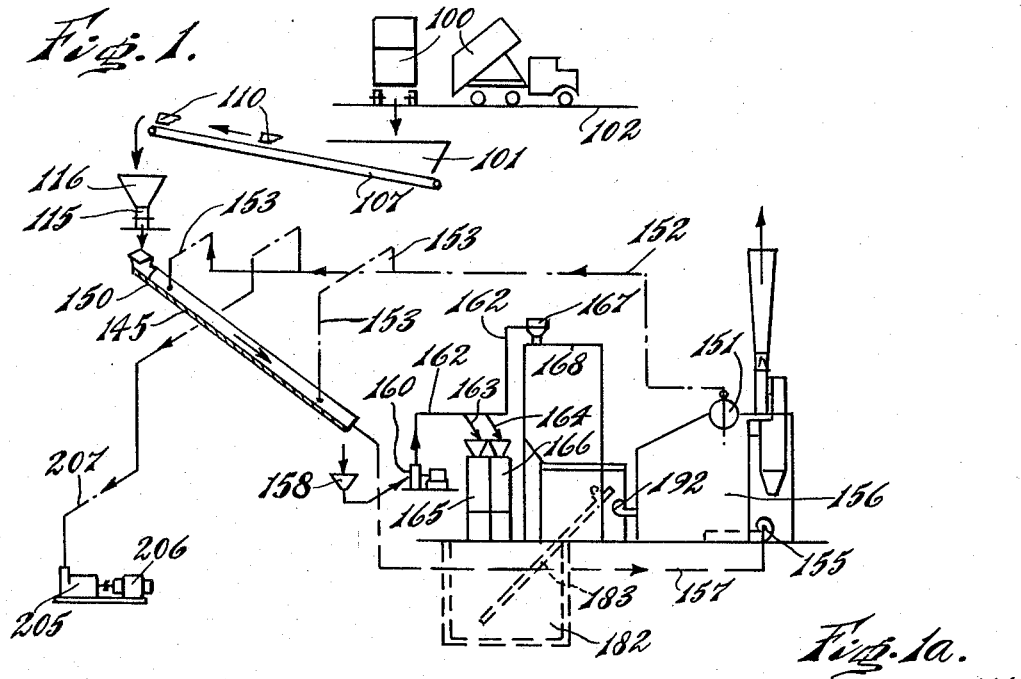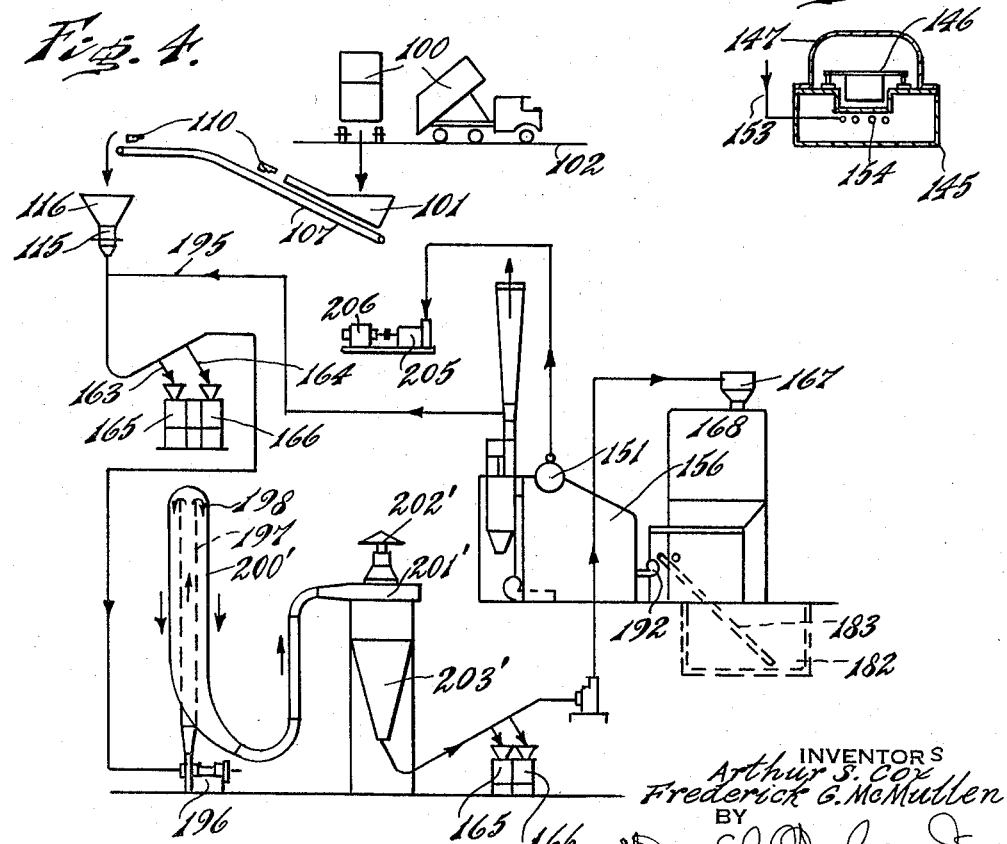

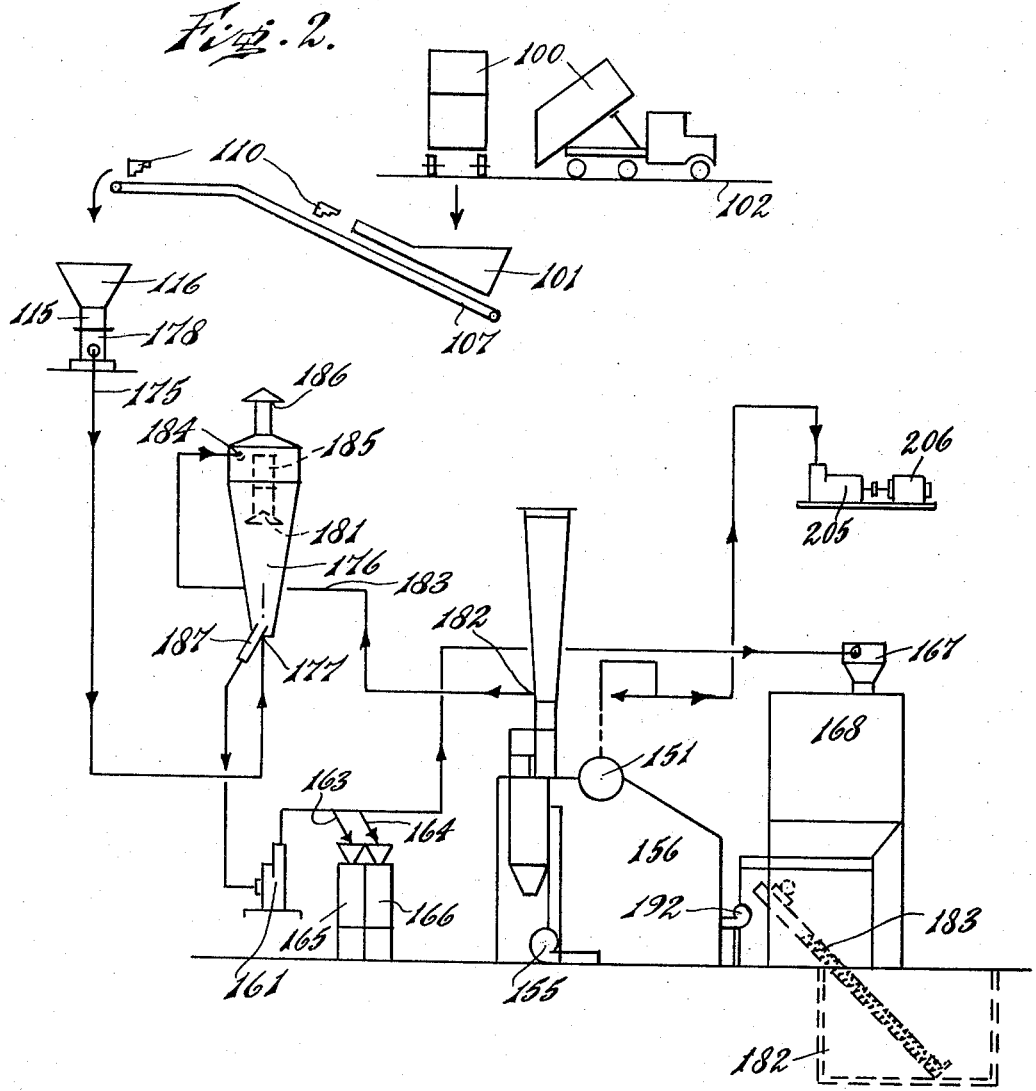

WASTE PROCESSING METHOD AND APPARATUS

Filed Oct. 16, 1963  6 Sheets-Sheet 3

INVENTORS
Arthur S. Cox
Frederick G. McMullen
BY
ATTORNEYS

Feb. 21, 1967    A. S. COX ET AL    3,304,894
WASTE PROCESSING METHOD AND APPARATUS
Filed Oct. 16, 1963
6 Sheets-Sheet 4
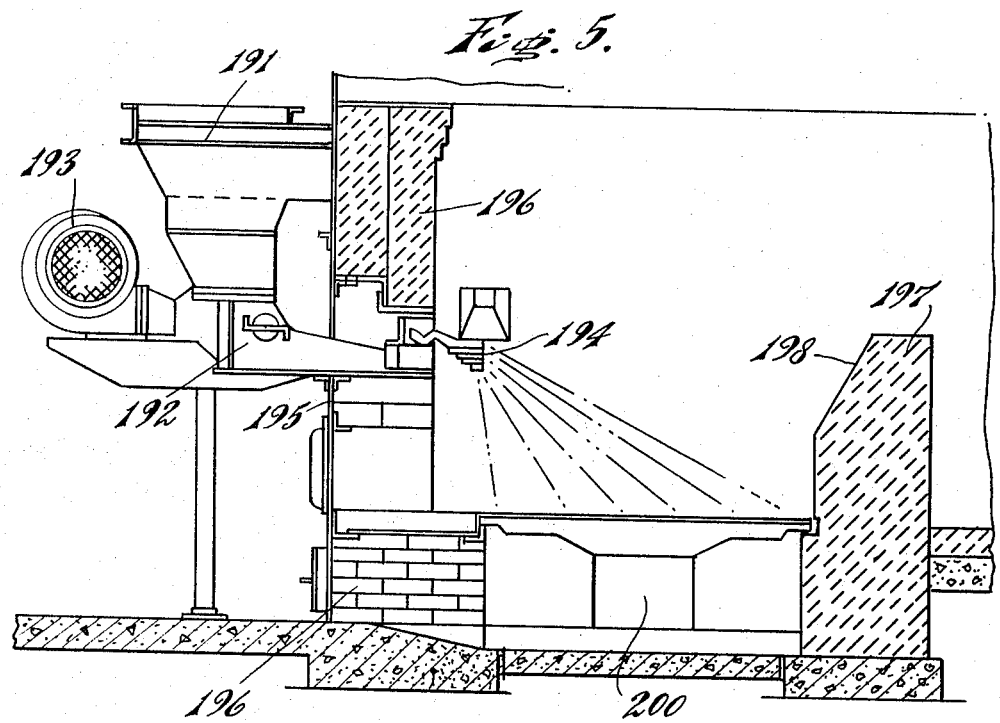
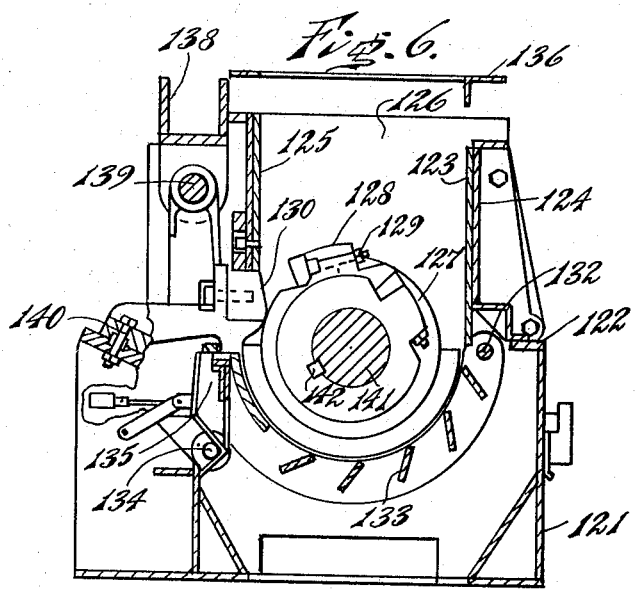
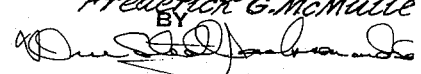

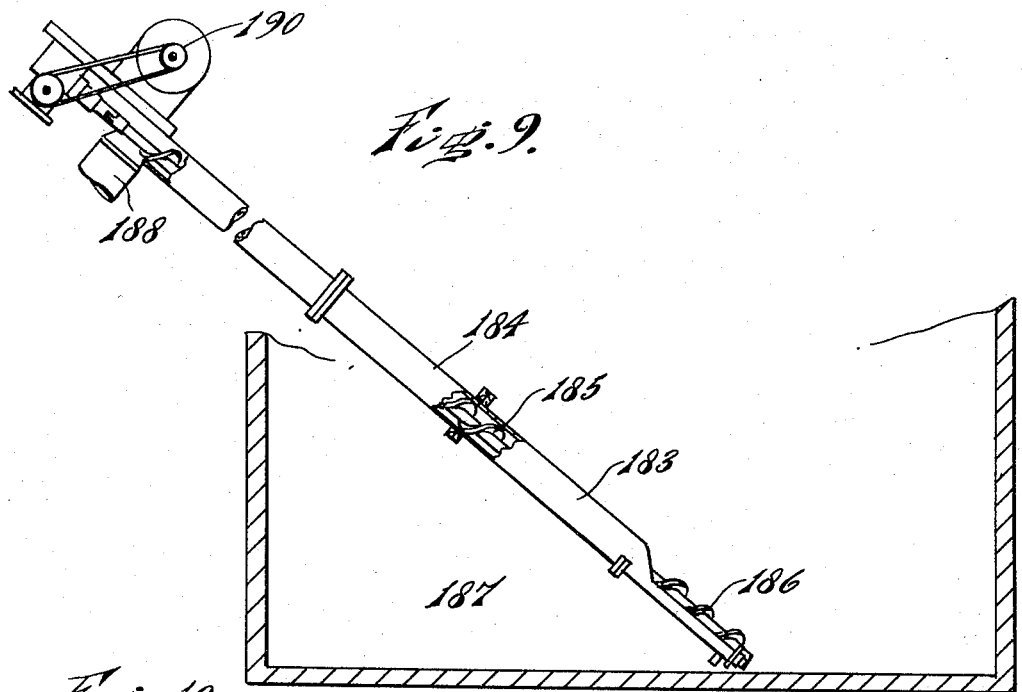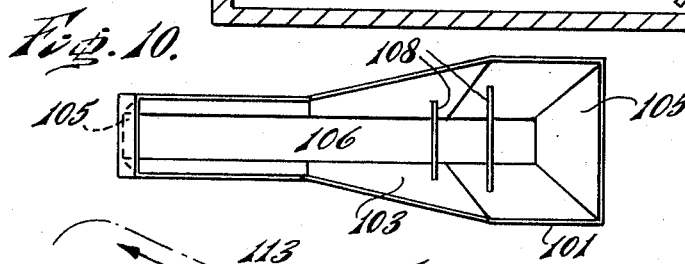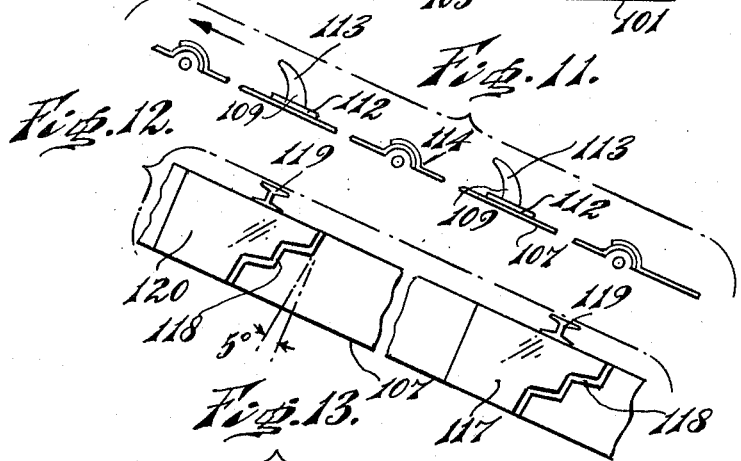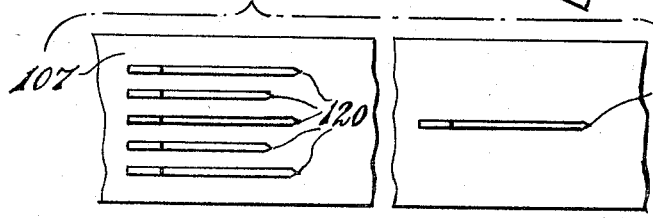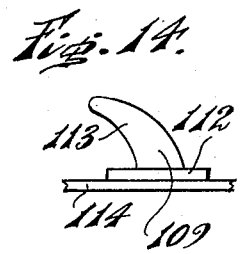

United States Patent Office 3,304,894
Patented Feb. 21, 1967

3,304,894
WASTE PROCESSING METHOD AND
APPARATUS
Arthur S. Cox, Jenkintown, and Frederick G. McMullen, Gwynedd Valley, Pa., assignors to Sui Generis Process, Inc., Glenside, Pa., a corporation of Pennsylvania
Filed Oct. 16, 1963, Ser. No. 316,591
2 Claims. (Cl. 110—15)

This invention pertains to a structure and method for converting waste products into a fuel and more particularly for converting residential, industrial and commercial refuse and trash, including sewage sludge or effluent, into a continuously prepared fuel and/or other by-products.

A purpose of the invention is to provide a system for processing refuse and debris of all kinds into a fuel.

A further purpose is to provide a process for mixing sewage sludge with refuse of all kinds to create a fuel or compost.

A further purpose is to convert refuse of all kinds and descriptions into an inexpensive fuel for use by central steam and process steam users.

A further purpose is to provide means to dispose of refuse on an economical basis.

A further purpose is to use municipal trash and garbage collection and industrial refuse for a fuel.

A further purpose is to provide a balanced fertilizer from municipal garbage and refuse collections.

A further purpose is to reduce trash and waste to an ash state to utilize a land fill capacity to perpetuate a land fill area.

A further purpose is to attrition flimsy non-combustibles to convert the non-combustibles into a reduced form.

A further purpose is to prepare the end fuel into briquette form.

A further purpose is to divert sewage sludge from a digester system at a point prior to entry into the digesters and the settling tank and the drying beds or drying apparatus and to introduce this into the attritioned trash to produce a fuel and/or a balanced fertilizer.

A further purpose is to provide a fuel preparation system wherein trash, refuse, garbage, and sewage sludge in general can be intermittedly dumped into the system upon which the system continuously prepares a fuel and/or a balanced fertilizer.

A further purpose is to destroy the harmful bacteria in the trash, refuse, garbage, and sewage sludge, during the preparation of the fuel and/or balanced fertilizer.

Further purposes appear in the specification and in the claims.

In the drawings we have chosen to illustrate a few only of the numerous embodiments in which our invention may appear, selecting the forms shown from the standpoints of convenience in illustration, satisfactory operation and clear demonstration of the principles involved.

FIGURE 1 is a schematic view of the basic system of the invention.

FIGURE 1a is a fragmentary section of the tunnel dryer and conveyor.

FIGURE 2 is a schematic drawing of the system of the invention which is an alternate to the basic system of FIGURE 1, wherein the refuse is flash dried using the inert exhaust gases from the steam generator.

FIGURE 4 is an alternative embodiment of the invention utilizing an alternate dryer for further preparing the fuel.

FIGURE 5 is a partial vertical side elevation showing a fuel injector and spreader in a furnace structure.

FIGURE 6 is an end sectional elevation of the attrition mill used in the invention.

FIGURE 9 is a side elevational view partially broken away of the supplementary fuel feeder used in the invention.

FIGURE 10 is a top plan view of the receiving hopper.

FIGURE 11 is a fragmentary sectional elevation of the live bottom conveyor of the invention.

FIGURE 12 is a fragmentary side elevational view of the drapers of the invention.

FIGURE 13 is a plan view of the drapers of FIGURE 12.

FIGURE 14 is an elevational view of the duck bills of the invention.

Figure 3:
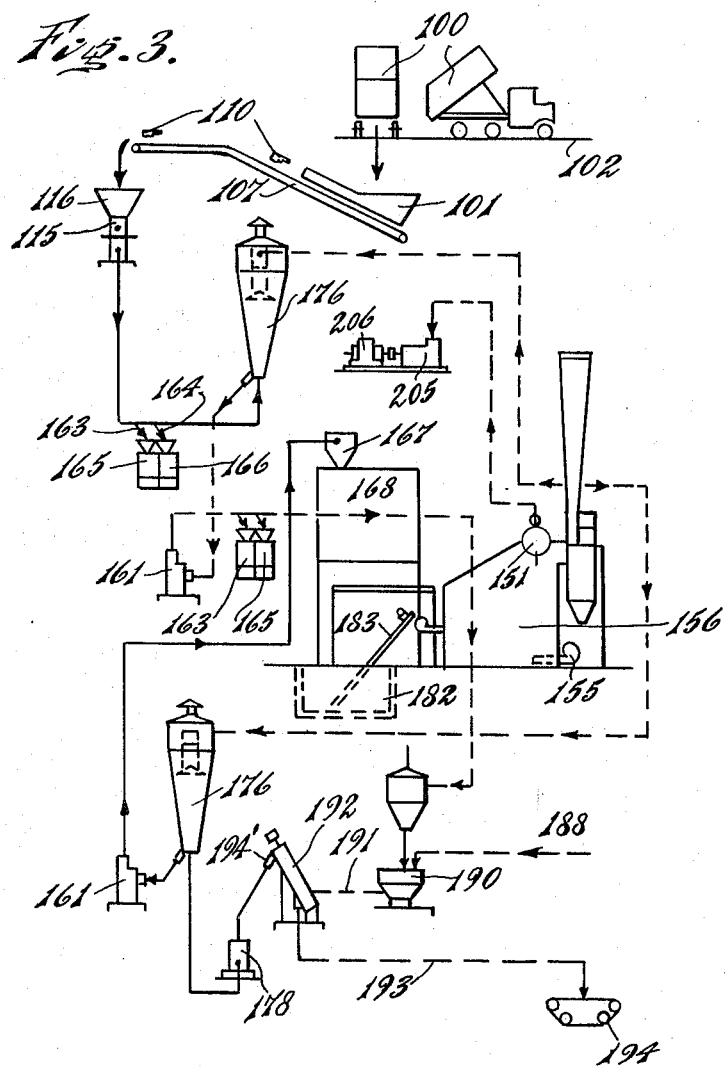
FIGURE 3 is an alternative embodiment of the invention including the addition of a centrifuge and an extractor whereby the system can utilize sewage sludge.

Describing in illustration but not in limitation and referring to the drawings:

In the prior art, numerous systems and structures have been used to dispose of industrial trash and refuse by means of incineration where the refuse is dumped usually in the "as collected state" into high capacity incinerators. In some instances, some very preliminary preparation of the collected refuse was performed by, for example, cutting lengths of poles into halves or chopping or otherwise breaking the refuse into a size and shape which could pass through the incinerating opening which, for instance, could be suitably a four foot by five foot opening. The incineration usually took place under a natural draft but in some instances forced draft or induced draft was used. Incineration of this type produced considerable fly ash, intensive objectionable odors, and a large quantity of residual ash. In addition, the entire heat of combustion of the refuse or trash was lost to the atmosphere.

The incinerator residue of the prior art was also in most instances considerable since non-combustibles, such as cans, pails, buckets, waste wire, bottles and the like often emerged from the incinerator in the same condition that they were introduced. There was often up to 14% incomplete combustion of the combustibles themselves and this contributed substantially to the incinerator residue.

In some selected instances in the prior art, waste products from industries, such as wood shavings, miter chips, sawdust and the like, have been burned to produce heat utilized in turn to produce steam for heating purposes and in some instances for power generating purposes. However, these installations could only utilize special and selected forms of refuse and could not effectively burn refuse in general or waste trash which was in composite form.

Further prior art efforts have been made to burn the sludge from municipal sewage disposal systems, but such efforts have been generally unsuccessful. These efforts included production of sludge into briquette form known as sludge bats, which are normally about ⅜ inch thick.

In the present invention all forms of waste, trash, and refuse, including sewage sludge and effluent, are received and properly prepared into a consistent and high-grade fuel which can be readily utilized for many end results. Uses of the fuel include incineration (where the products of combustion are vented to the atmosphere, or are captured by waste heat boilers to produce steam), use in boilers for production of steam for heating, process and power generation, for use in sanitary land fill, for transfer to distant locations or remote locations for use as a fuel, and for any other use where such fuel is desirable. The trash is prepared in successive steps to reduce the trash to approximately confetti size, after which it is dried and either stored or burned or removed.

Considering the following steps and referring to FIGURE 1, trucks 100 having suitable approach areas 102 simultaneously dump a composite refuse, which permissibly includes a moisture content, into a receiving hopper 101 positioned suitably below the truck supports 102. This composite refuse can include any form of municipal or industrial waste, such as garbage, paper, cardboard, glass, cans and other metals, milk cartons, bags, wood shavings, and the like.

The receiving hopper 101 is suitably of steel and has, for instance, sloping sides 103 and ends 105 which position the refuse above an apron conveyor. The receiving hopper, as shown in FIGURE 10, has sloping sides 103 and ends 105 wherein the refuse is gradually directed toward an opening 106 in the bottom of the hopper which positions the refuse over a live bottom conveyor 107. By a live bottom conveyor it is intended to mean a conveyor which covers completely the bottom open area 106 of the receiving hopper 101 and which moves the refuse from any point within this opening. Suitable leveling beams 108 prevent the dumped refuse from jamming in the receiving hopper 101 at the discharge end and distribute the refuse to achieve a suitable depth of, for instance, 2 feet on the live bottom conveyor in its travel to the drapers 110.

The apron type steel conveyor 107 has specially designed duck bill lugs 109. The duck bills 109, as shown in FIGURE 11, constitute a base portion 112 which is suitably secured to the conveyor as by bolting or welding or the like, and a hook portion 113 which is arcuately directed in the direction of motion of the conveyor as shown by the arrow. The duck bills 109 are suitably spaced at a distance of, for instance, 4 feet which may not necessarily be in phase with the conveyor plates 114. A suitable distance is necessary in order to allow the material to achieve a desirable level by the time it reaches the drapers 110. The duck bills 109 are transversely staggered on the conveyor to achieve a rending action on the refuse as the duck bills pass through the drapers 110.

The live bottom apron conveyor 107 is driven by an electric motor of, for instance, 10 H.P., with a variable speed drive connected to a stop-start, jog, and reverse, push button control. A suitable horizontal platform or the like is provided along the apron conveyor in order to provide a picking area for removal of tramp iron from the conveyor by an individual with, for instance, a long hook or the like who reaches onto the conveyor with his hook and removes the tramp iron.

Two sets of drapers 110 are used to pre-rend and reduce the material to a suitable size for admission to the attrition mill 115. These drapers 110 reduce the material to a size which will not exceed 2 feet in length, for instance, so that the material can pass by means of a free fall into the inlet of the attrition mill 115. A chute 116 is positioned above the attrition mill 115 to receive and guide the material into the mill.

As seen in FIGURES 12 and 13, a primary draper 117 having a sawtooth edge 118 is fixed over the center of the conveyor from an overhead suspension such as a beam 119 or the like extending over the conveyor and anchored to a frame at the sides of the conveyor. The sawtooth edge 118 slopes toward the conveyor 107 so the duck bills 109 anchored in the refuse drag the refuse past the stationary drapers causing the drapers to rend the material. The drapers are suitably of hardened steel plates having a sharp sawtooth edge 118. The secondary drapers 120 are spaced downstream of the moving conveyor and further rend the material as the duck bills 109 drag the material through the drapers. It should be understood, of course, that the duck bills 109 are suitably spaced with respect to the drapers to avoid any interference with the drapers. The purpose of this arrangement is to take the refuse and through shear force move it through this rending operation so that a complete shearing action of the refuse is obtained in preparation for dumping into the attrition mill 115. It should be understood any suitable arrangement of duck bills and drapers could be used to pre-rend the refuse prior to entering the attrition mill.

The attrition mill 115 is of a conventional form and suitably of the type shown in FIGURE 6. This attrition mill is of a type using a punch and die action, wherein teeth mounted on a shaft rotate through slots in the anvils which are mounted horizontally adjacent to the rotating teeth. The teeth are staggered on the rotor.

In the preferred form, the grinding of the material in the machine is accomplished by a double action operation. The rotor in the machine is made up of alternating high and low teeth. When the material enters the mill, the high teeth are the first to come into contact with the material and each high tooth punches out a piece of material the size of the tooth. This accomplishes the first stage of the double action. The second stage is accomplished when the material drops down between adjacent high teeth and the low teeth cut off the pieces of material left between the holes punched by the high teeth. In the construction of the attrition mill, as shown in FIGURE 6, the mill is of a conventional type having a lower housing 121 supporting and bolted to a lower half of an upper housing 122. A wear plate 123 covers the rear door 124 as attached thereto and a wear plate 125 is connected to the left half end of the upper housing 122. A wear plate 126 extends over the anvils. A small breaker ring 127 is secured to the large breaker ring 128 by means of hardened steel nuts 129. Large anvil points 130 and small anvil points (not shown) are suitably secured to the housing. A screen 133 is pivotally secured to the housing by means of screen pivot pin 132 and is held at the other end to the housing by means of a screen latch 135 acting on a screen latch pivot pin 134. A hopper companion 136 is secured to the top of the housing and supports the chute 116.

An anvil support bar 138 extends across and is connected to the housing on an anvil pivot pin 139. Shear bolts 140 secure the anvil against rotation and provide a margin of safety in event the attrition mill receives objects which could not be rendered without damaging the breaker ring. The breaker rings rotate on shaft 141 and are held thereto by pin 142.

The majority of material discharging from the attrition mill will be of a diameter of ½ inch or less and of a thickness of $10/1000$ inch or less. A small percentage of the discharge runs up to approximately 1 inch in diameter and of a thickness of, for instance, $30/1000$ inch. A small percentage of the discharge of the attrition mill will be in the form of a fine powder.

The discharge of the attrition mill 115 is dumped into a tunnel dryer and conveyor 145 of a conventional type having a drag scraper conveyor 146 and having an enclosure 147 extending over the conveyor where gases or other drying fluids are suitably passed over the conveyed material to dry such material. Live steam from the boiler drum 151 is passed through lines 152 to a conduit 153 extending beneath the conveyor 146 of the tunnel dryer and conveyor 145. The live steam is piped from conduit 152 through conduits 153 into coils 154 extending beneath the drag link conveyor to suitably heat the material on the conveyor to drive off the volatile gases and properly dry the material. The condensate of this steam returns to the feed water heater through suitable piping.

The volatiles driven from the material are collected in the tunnel portion 147 of the dryer and are sucked by the forced draft fan 155 which provides plenum chamber pressure to the forced draft grates of the boiler 156. The volatiles pass from the tunnel dryer and conveyor 145 to the forced draft fan 155 through a suitable conduit 157.

The dried materials drop from the end of the tunnel dryer and conveyor 145 into a receiving hopper 158 which is the receiving end of a cyclone blow pipe collector system 160.

In many instances, these volatile gases may be up to 30% by weight of the attritioned material. The volatile gases driven from the attritioned material are passed to the grates of boiler 156 for burning in order to dispose of these gases without dumping them into the atmosphere where they could both carry germs from the attritioned debris and also carry objectionable odors. During the travel of the attritioned material through the dryer, the material is subjected to temperatures from the steam coils which are suitably in the neighborhood of above 200 degrees Fahrenheit. At this temperature, any disease bearing germs in the attritioned material are destroyed while beneficial bacteria in the attritioned material are preserved for possible use in supporting plant life where the prepared fuel is used for a balanced fertilizer or land fill or mulch.

The cyclone blow pipe collector system includes a fan 161 which creates an air flow through blow pipe 162 to carry the attritioned material past gravity separators 163 and 164. The blow pipe 162 is on an upward incline and the gravity separators 163 and 164 comprise spaced openings in the bottom of the blow pipe 162 which cause the heavier materials while traveling along the bottom of the blow pipe to drop into the openings and pass into the collecting bins 165 and 166 of the separators.

The material passes on through blow pipe 162 into and through cyclone collector 167 which is used to vent the blow pipe air to the atmosphere while at the same time collecting and depositing by gravity the attritioned material into live bottom storage bin 168.

Figure 7:
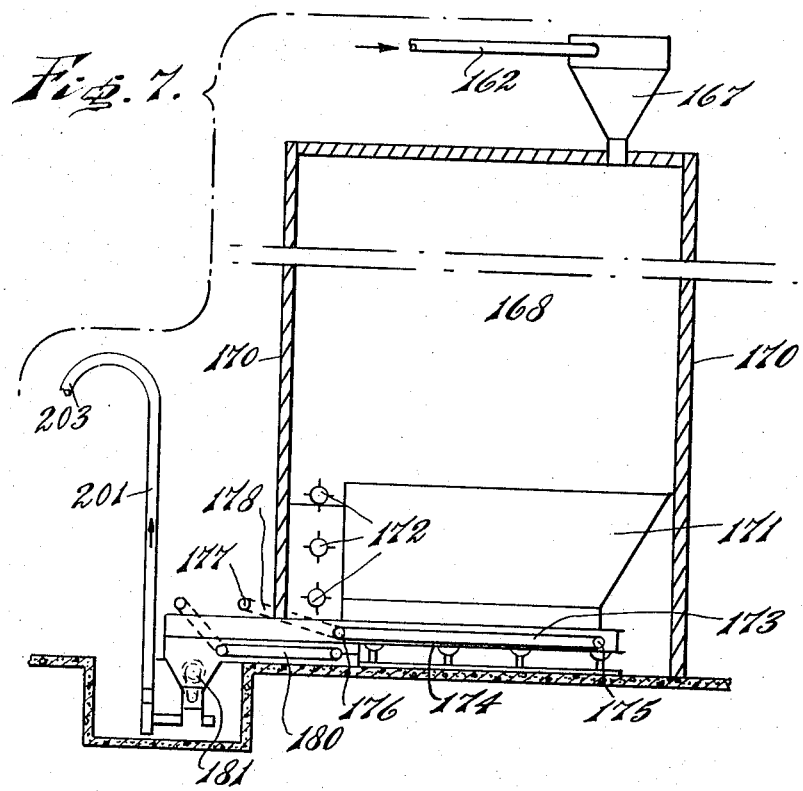
FIGURE 7 is a vertical section of the live bottom storage bin used in the invention.
Figure 8:
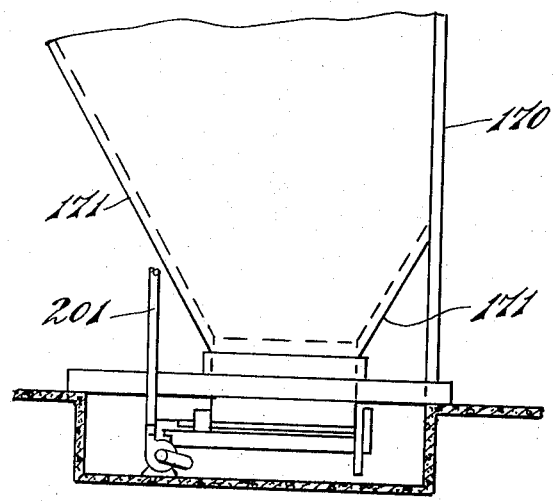
FIGURE 8 is a partial end elevation of the bin shown in FIGURE 7.

The live bottom storage bin is suitably shown in FIGURE 7. The attritioned material drops from cyclone collector 167 by gravity into the live bottom storage bin 168 having vertical walls 170 and bottom guide walls 171. Agitators 172 rotate and constantly shake the stored material to provide an even flow onto a screen web conveyor 173 having an endless web 174 passing over guide rollers 175 and 176 and driven by drive means 177 through drive belt 178. The material drops onto transfer conveyor 180 into collecting hopper 181. The transfer conveyor is also known as a metering conveyor and has a variable speed drive to properly control the feed to the boiler. The variable feed control is automatically controlled by the steam demand from the boiler.

The fuel passes from receiving hopper 181 into the cyclone fan blow pipe 201. An auxiliary coal supply 182 keeps a supply of standby fuel, such as coal, to supply any deficiencies in the fuel prepared from the refuse raw material. The standby fuel, for instance, coal, is carried to the stoker by means of a tube enclosed screw 183 for feeding solid fuels as shown in FIGURE 9. The conveyor 183 includes tube 184 and helical screw 185 which receives material at 186 from bin 187 and passes it into discharge pipe 188 which suitably leads to the stoker. A drive 190 rotates the helical screw.

The material enters the stoker as shown in FIGURE 5 by gravity drop into hopper 191 where fuel injector 192 which has a fuel blower 193 which passes air under pressure through a venturi which carries with it fuel from hopper 191 into the furnace interior where it impinges on spreader 194 and spreads in a pepper and salt manner in fan fashion over the entire grate area of, for instance, 8 feet. Where necessary, a greater number of fuel injectors can be used side by side to obtain the necessary coverage. The stoker includes a front 195, walls 196 and a back wall or bridge wall 197 having an inclined heat reflecting surface 198. Suitable ash removal can be achieved from ash chamber 200 which is also a plenum chamber to hold desired static pressure created by the forced draft fan 155.

A suitable steam generating unit can be, for instance, of a capacity of 25,000 pounds of steam or more. The unit itself is of a design capable of an 80% suspension burning with proper grate area and furnace volume and 20% burning on special pinhole grates which permit emission of forced air draft at approximately 1 inch static water column pressure from the plenum chamber 200. By 80% suspension burning it is meant that 80% of the fuel burns above the grates in midair. The heavier attritioned pieces which comprise 20% of the fuel drop to the grates and are burned thereon.

The forced draft air is suitably controlled by means of louvers at the vortex of the forced draft fan 155, the louvers in turn being controlled by steam demand on the boiler.

The air which is supplied beneath the grates in plenum chamber 200 is air primarily for combustion of the heavier particles upon the grate, the combustion air utilized in burning the fines in suspension being properly introduced by fan 193 of the fuel injector 192. The fan 193 is suitably manually controlled both in static pressure and volume.

In the event that it is desired to remove the fuel from the system prior to entry into the stoker, a suitable blow pipe 201 is positioned at the outlet of the live bottom storage bin 168. Divider means are provided to selectively permit fuel to enter blow pipe 201. A suitable cyclone fan introduces air into blow pipe 201 to convey pneumatically the fuel along the blow pipe 201 to a discharge 203 into a suitable conveyance.

The steam produced in steam generator 156 is carried through conduits 152 to, where desired, turbines 205 which drive generators 206, the steam being carried from line 152 to the generators by line 207. In other instances, the steam is passed by suitable conduits to terminal equipment machinery which is in effect driving machinery for each piece of equipment used in the system.

Referring now to an alternative embodiment of the invention as set forth in FIGURE 2, we see a similar arrangement to that described in FIGURE 1 with a modification in the means for drying the attritioned material. Where the embodiment of FIGURE 2 has elements common to the embodiment of FIGURE 1, like numerical reference characters will be used.

Attritioned material is discharged from the attrition mill 115 and passes by gravity means into a low volume high pressure air pump 178 which feeds the attritioned material into the flash dryer 177 and impinges the material against spreader cone 181 within the dryer. Suitable inert hot exhaust gases at, for instance, 600 degrees Fahrenheit are tapped from the furnace stack at 182 and pass through conduit 183 into dryer 176 at 184. The gases entering at 184 strike baffles 185 and are driven tangentially within the dryer. The spread-out material from the cone 181 encounters the whirling hot gases and is driven downwardly in the dryer. During this period, the solids receive a downward force and, along with the force of gravity, are directed to the bottom of the dryer and are discharged at 187 into cyclone fan 161. During this operation, the attritioned material is dried of volatile matter and moisture down to as low as 5% of the content. The gases are then vented at 186 to the atmosphere. If, however, these exhaust gases have any objectionable odors, they can be channeled into the plenum chamber of the steam generator where they can be consumed in the burning operation.

There is shown in FIGURE 3 an embodiment of the invention which utilizes the refuse and trash as described in the embodiments of FIGURES 1 and 2 as well as sewage from a collecting system of a municipality or the like. The sewage may be in raw form but desirably has been subjected to some concentration of solids as by a settling tank.

The raw sewage or sewage sludge is introduced through raw sewage supply 188 which enters a centrifugal mill 190. Simultaneously, there is introduced into the centrifugal mill dry attritioned material which is either bypassed or tapped from the live bottom storage bin. The centrifugal mill is of a conventional type utilizing a liquid to obtain pulverizing action of a solid.

In this operation, the raw sewage which is highly liquid in form is mixed with the attritioned material and then passed through discharge 191 into liquid extractor 192. Surplus water is extracted in this extractor by means of a helical screw which has a variable pitch wherein the solids are compressed as they travel upward under the impetus of the helix. The liquid is squeezed out and travels under the influence of gravity into the discharge 193 where it is passed into a suitable receptacle at 194. A pump may be used at this point to pass the liquid into the desirable discharge. The solids pass out of the extractor at 194' into pump 178.

The discharge of the extractor is a combination of the ground attritioned material and the sewage solids intermixed into a homogeneous mixture. In effect, this discharge will physically resemble semi-dried paper pulp and will be in the form of particles in the nature of ⅜ inch at their greatest dimension.

At this point the discharge of the extractor enters the high pressure low volume air pump 178 set forth in the embodiment of FIGURE 2. The high pressure low volume pump 178 carries the discharge into the flash dryer 176 where it now proceeds as in the arrangement of FIGURE 2. It should be understood, of course, that a tunnel dryer, as shown in FIGURE 1, can also suitably be used in place of the flash dryer of FIGURE 3.

The use of an alternative form of flash dryer is shown in the embodiment of FIGURE 4. The flash dryer of FIGURE 4 has hot exhaust gases enter from the stack of the boiler through line 195 into the conduit coming from the attrition mill 115. These hot gases are suitably inert in order to prevent flashing at temperatures at which they contact the attritioned material. The hot gases carry the attritioned material into a cyclone fan 196 which carries the material into an inner cylindrical pipe 197 open at the top which passes and reverses the gases and material at 198 downward in the dryer. The hot gases carry the attritioned material downwardly between the inner and outer circumference of the dryer at 200' and pass into a cyclone collector at 201'. The hot gases then pass out of the cyclone collector at 202' and the dried attritioned material drops downwardly and is collected at 203'. The dried attritioned material then passes upward in the blow pipe where it passes over gravity extractors 165 and 166 and then enters into the storage bin as described in the previous embodiments. The dryer of FIGURE 4 will be suitably used where inert hot combustion gases are available.

In typical results, the end material of the invention has a B.t.u. content of 7000 to 8800 B.t.u.'s per pound. It should be understood, however, that where unusual conditions such as where a high percentage of the refuse is plastic waste such as polyethylene, neoprene, polyesters, Bakelite, phenolic resins, and the like, the B.t.u. content is considerably higher and may run, for instance, up to 24,000 B.t.u.'s per pound. It should be noted that normally waste of this sort when incinerated in raw form produces extremely objectionable odors and has been looked upon as very undesirable refuse to incinerate. In addition, the products of combustion of these forms of plastics were often in the form of a dense rolling smoke and produced a very undesirable effect on the neighborhood.

Although the attritioned material will vary in respect to the proportion of refuse and trash dumped into the system, a typical operation will give 60 to 70% by weight finished attritioned material as a proportion of the material entered into the system. This would include, for instance, a raw product having a 10 to 20% metal content. The sewage result will depend on the proportion of liquids entering into the centrifugal mill. For instance, when the sewage contains 50% liquid, this liquid will be driven off and extracted and the resulting combustible fuel will be 50% of the initial raw product by weight.

The attritioned fuel provides a base around which the combustion of the sewage sludge is supported. In addition, the sewage itself contains many combustibles where the sewage system is used, for instance, in large apartment house installations as a general purpose disposal system.

The ash content of the fuel will vary from a low of 1% to a high in most instances of 3 to 3½%. Where the refuse and trash has a minimum of glass and is substantially wood, garbage, and other cellulose materials, the ash content will be in the neighborhood of 1%. Where glass is introduced into the refuse, the attrition mill will reduce the glass to silica sand and this will be carried over into the furnace. This silica sand will find its way into the ash and raise the ash content to 3 to 3½%. This ash content will include small bits of wire which bypass the gravity separators and other small metallic pieces.

In view of our invention and disclosure, variations and modifications to meet indidivual whim or particular need will doubtless become evident to others skilled in the art, to obtain all or part of the benefits of our invention without copying the structure and method shown, and we, therefore, claim all such insofar as they fall within the reasonable spirit and scope of our claims.

Having thus described our invention what we claim as new and desire to secure by Letters Patent is:

1. In a system for processing waste and sewage into fuel, an attrition mill for reducing waste to a size having a maximum dimension of one-half inch, a centrifugal mill, means for conveying the attritioned waste into the centrifugal mill, means within the centrifugal mill for mixing the waste and sewage into a mixture, means for extracting liquid from said mixture to convert said mixture into a condition resembling semi-dried paper pulp, and means for drying said mixture after the liquid has been extracted.

2. The method of converting waste and sewage sludge into fuel and disposing of same comprising pre-rending the waste, attritioning the waste into particles having less than one-half inch maximum dimension in an attrition mill, introducing the attritioned waste into a centrifugal mill, introducing sewage into the centrifugal mill, mixing the sewage and attritioned waste in the centrifugal mill to form a mixture, extracting liquid from the mixture to convert said mixture into a condition resembling semi-dried paper pulp, and drying and burning the mixture.

References Cited by the Examiner

UNITED STATES PATENTS

| 1,695,272 | 12/1928 | Christian et al. | 198—57 |
| 1,809,819 | 6/1931 | Caller | 110—7 |
| 2,150,735 | 3/1939 | Williams | 146—163 |
| 2,213,668 | 9/1940 | Dundas et al. | 110—15 |
| 2,446,772 | 8/1948 | Laughlin | 146—163 X |
| 2,450,583 | 10/1948 | Crozier | 146—163 |
| 3,109,392 | 11/1963 | Riepl et al. | 110—8 |
| 3,159,353 | 12/1964 | Atwater | 110—8 |

JAMES W. WESTHAVER, *Primary Examiner.*